(12) United States Patent
Takahashi

(10) Patent No.: US 8,662,689 B2
(45) Date of Patent: Mar. 4, 2014

(54) POINTER-TYPE METER

(75) Inventor: Yasushi Takahashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 13/640,464

(22) PCT Filed: Apr. 15, 2011

(86) PCT No.: PCT/JP2011/059346
§ 371 (c)(1),
(2), (4) Date: Oct. 10, 2012

(87) PCT Pub. No.: WO2011/136040
PCT Pub. Date: Nov. 3, 2011

(65) Prior Publication Data
US 2013/0027903 A1    Jan. 31, 2013

(30) Foreign Application Priority Data
Apr. 28, 2010  (JP) ................................ 2010-104387

(51) Int. Cl.
*G01D 13/28* (2006.01)
(52) U.S. Cl.
USPC ..................... 362/23.14; 362/489; 362/23.07; 362/23.21
(58) Field of Classification Search
USPC ............ 362/23.01, 23.07, 23.14, 23.19, 23.2, 362/23.21, 489
See application file for complete search history.

(56) References Cited

U.S. PATENT DOCUMENTS

2010/0284164 A1 * 11/2010 Manivannan et al. .......... 362/23

FOREIGN PATENT DOCUMENTS

| JP | 4-079214 U | 7/1992 |
|---|---|---|
| JP | 2004-226285 A | 8/2004 |
| JP | 2005-257496 A | 9/2005 |
| JP | 2005-338059 A | 12/2005 |
| JP | 2007-232570 A | 9/2007 |
| JP | 2008-002996 A | 1/2008 |
| JP | 2008-089478 A | 4/2008 |
| JP | 2009-128242 A | 6/2009 |
| JP | 2009-133644 A | 6/2009 |
| JP | 2009133644 A * | 6/2009 |

OTHER PUBLICATIONS

International Search Report issued in International Application No. PCT/JP2011/059346 issued on Jul. 5, 2011.

* cited by examiner

*Primary Examiner* — David V Bruce
(74) *Attorney, Agent, or Firm* — McDermott Will & Emery LLP

(57) ABSTRACT

Disclosed is a pointer-type meter with good uniformity of illumination of a display section even when there are few light sources, and with little or no displacement of each member when positioning is performed. A circuit board provided in the pointer-type meter comprises a first light-emitting element (332a) that emits light in a direction towards a first rotary shaft (3110). The pointer-type meter comprises: a first reflecting unit (321) positioned between the circuit board and a display plate (31) and that surrounds part of the circumference of the rotary shaft (3110) and reflects light towards the outer edge of a speed display unit (311); and a second reflecting unit (322) positioned between the circuit board and the display plate (31) and that reflects the light reflected by the first reflecting unit (321) to illuminate the speed display unit (311).

9 Claims, 5 Drawing Sheets

POINTER-TYPE METER

RELATED APPLICATIONS

This application is the U.S. National Phase under 35 U.S.C. §371 of International Application No. PCT/JP2011/059346, filed on Apr. 15, 2011, which in turn claims the benefit of Japanese Application No. 2010-104387, filed on Apr. 28, 2010, the disclosures of which Applications are incorporated by reference herein.

TECHNICAL FIELD

The present invention relates to a pointer-type meter.

BACKGROUND ART

Desirably, an indication part of a pointer-type meter is uniformly illuminated in view of visibility. For example, a pointer-type meter disclosed in Patent Literature 1 includes a light source that is disposed near around a rotary shaft to emit light toward an outer edge of an indication panel from the rotary shaft, a reflection part that reflects the light emitted from the light source toward the direction of the indication panel; and other reflection parts that are provided near around the rotary shaft, and has attempted to allow the light from the light source to be diffused and reflected reciprocally by the reflection of the reflection parts such that the indication part is uniformly illuminated.

Furthermore, as an example of a structure of the conventional pointer-type meter, there is a structure in which a plurality of main constituting members are positioned in each member as disclosed in Patent Literature 2.

CITATION LIST

Patent Literature

[PTL 1] Japanese Unexamined Patent Application Publication No. 2004-226285
[PTL 2] Japanese Unexamined Utility Model Application Publication No. H4-79214

SUMMARY OF INVENTION

Technical Problem

However, at the present time, in addition to the meters disclosed in Patent Literatures 1 and 2, a further functional improvement is required.

First, in the meter according to Patent Literature 1, since a main optical path from a light source to an indication part is a path to an indication panel after one-time reflection in a reflection part, if the number of light sources is small, light is not sufficiently diffused, so that the indication part may not be uniformly illuminated.

Subsequently, the meter according to Patent Literature 2 has inconvenience in that it has a structure where a plurality of main constituting members are positioned in each member, and therefore if displacement of each positioning occurs, then displacement of each constituting member is large.

Therefore, the present invention has been achieved in view of the above-described problems, and a first object thereof is to provide a pointer-type meter with excellent uniformity of illumination to an indication part even when the number of light sources is small. Furthermore, a second object thereof is to provide a pointer-type meter with little or no displacement of each member when positioning is performed.

Solution to Problem

In order to achieve the above object, a pointer-type meter according to a first aspect of the present invention is a pointer-type meter, comprising:
a circuit board;
an indication panel that is disposed at a front side of the circuit board and includes a first indication part;
a pointer that points the first indication part; and
a rotary shaft that rotates the pointer, wherein
the circuit board includes a first light source that emits light toward the rotary shaft, and
the pointer-type meter further includes:
a first reflection part that is disposed between the circuit board and the indication panel, surrounds at least a part of a periphery of the rotary shaft, and reflects the light, which is emitted from the first light source, toward an outer edge of the indication part; and
a second reflection part that is disposed between the circuit board and the indication panel, and reflects the light reflected by the first reflection part to illuminate the first indication part from a rear side.

In order to achieve the above object, a pointer-type meter according to a second aspect of the present invention is a pointer-type meter, comprising:
a first member that constitutes a rear case;
a second member that is disposed at a front side of the first member and has an indication part; and
a third member that serves as a front case that covers the second member and has a transparent member for allowing the indication part to be viewed, wherein
the first member has one or more rod-like positioning members that extend from a bottom surface of the first member in a front direction and reach the third member with passing through the second member, thereby positioning the second member and the third member with respect to the first member.

In order to achieve the above object, a pointer-type meter according to a third aspect of the present invention is a pointer-type meter, comprising:
a first member that constitutes a rear case;
a second member that is disposed at a front side of the first member and has an indication part; and
a third member that serves as a front case that covers the second member and has a transparent member for allowing the indication part to be viewed, wherein
the third member has one or more rod-like positioning members that extend from a bottom surface of the third member in a rear direction and reach the first member with passing through the second member, thereby positioning the second member and the first member with respect to the third member.

Advantageous Effects of Invention

In accordance with the pointer-type meter according to a first aspect of the present invention, even when the number of light sources is small, the uniformity of illumination to the indication part is excellent. Furthermore, in accordance with the pointer-type meter according to second and third aspects of the present invention, there is little or no displacement of each member when positioning is performed.

DESCRIPTION OF EMBODIMENTS

Figure 1:
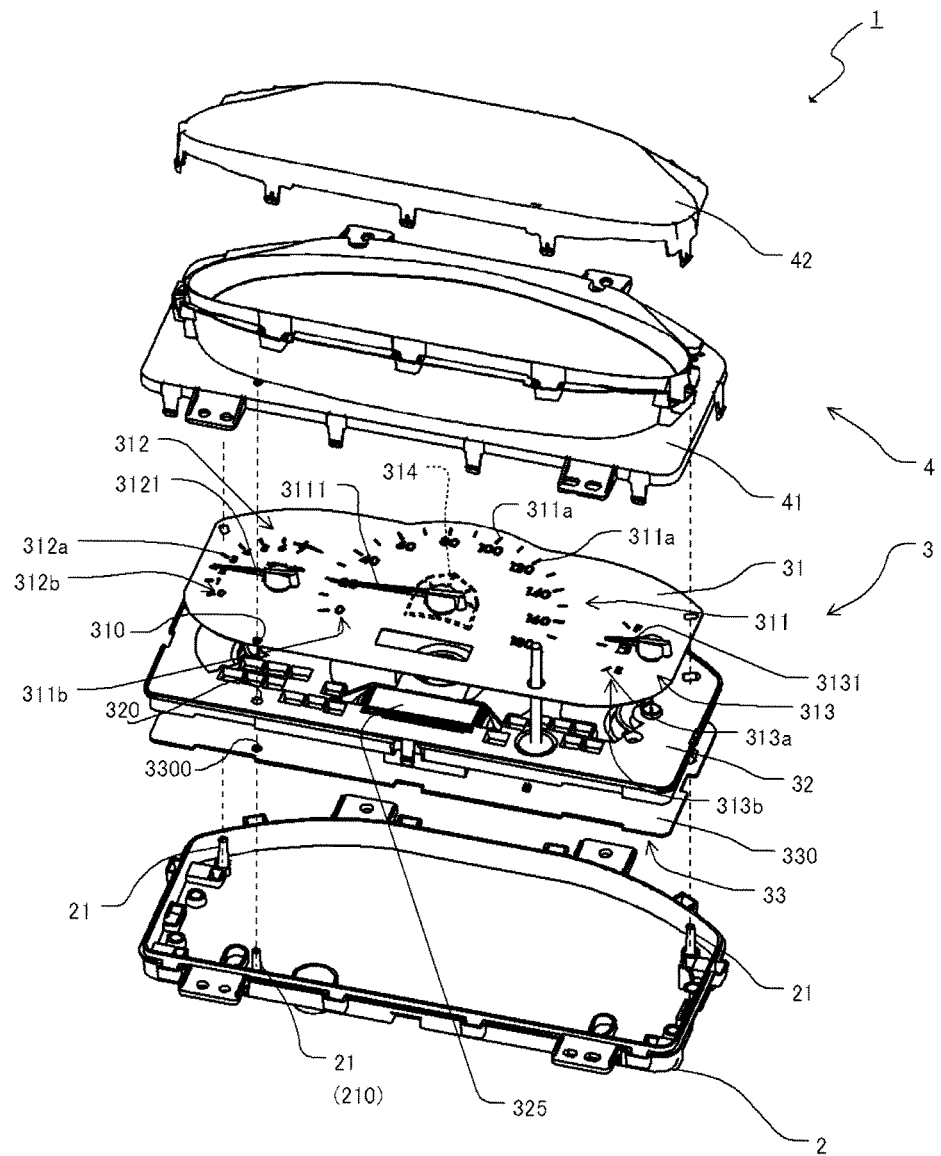
FIG. 1 is an exploded perspective view of a vehicle meter according to a first embodiment of the present embodiment.

Below, a first embodiment according to the present invention will be described with reference to the accompanying drawings. In addition, the present invention is not limited to the following embodiment (also includes the contents of the drawings). It is of course that modification (also includes deletion of constituent elements) can be applied to the following embodiment. Furthermore, in the following description, in order to facilitate the understanding of the present invention, a description of well-known technical matters will be properly omitted. Moreover, in the drawings, when there are a plurality of constituent elements having the same or similar function, reference numerals are used to designate only a part thereof. Furthermore, in the drawings, for some constituent elements (a light emitting element and a liquid crystal panel), hatching indicating a cross-section is omitted. Furthermore, dots of the drawings are for clarifying a predetermined area, and do not indicate a cross-section.

A pointer-type meter according to the present invention is a vehicle meter 1. The structure of the vehicle meter 1 will be described with reference to FIG. 1 to FIG. 5. In addition, the vehicle meter 1 is a meter device provided with a speedometer, a tachometer (an engine tachometer), and a fuel gauge. Each of these elements is configured to include a pointer, a stepping motor, an indication part and the like, which will be described later.

The vehicle meter 1 includes a rear case 2 (an example of a first member), a meter body 3 (an example of a second member), and a front case 4 (an example of a third member). The rear case 2 and the front case 4 accommodate the meter body 3, and are combined with each other to configure the vehicle meter 1. The rear case 2 is positioned at a rear side of the meter body 3, and the front case 4 is positioned at a front side of the meter body 3. Here, the "front" denotes a viewing direction of a user (for example, a driver of a vehicle assembled with the vehicle meter 1) with respect to the vehicle meter 1 when the user views the vehicle meter 1 from the front side (refer to FIG. 1). On the other hand, the "rear" denotes a direction of the vehicle meter 1 with respect to a viewpoint of the user (refer to FIG. 1). Furthermore, the upper part (the upper direction in FIG. 2) when the user views the vehicle meter 1 from the front side is defined as "upper", and the lower part (the lower direction in FIG. 2) is defined as "lower" in the following description (refer to FIGS. 1 and 2). Furthermore, the right (the right direction in FIG. 2) when the user views the vehicle meter 1 from the front side is defined as "right", and the left (the left direction in FIG. 2) is defined as "left" in the following description (refer to FIG. 2).

The meter body 3 includes an indication panel 31, an intermediate member 32 (configures a so-called middle case), a circuit board 33, a liquid crystal panel 325 (an example of a third indication part), a pointer 3111, a pointer 3121, and a pointer 3131.

The circuit board 33 is attached to the intermediate member 32 from the rear side. The indication panel 31 and the liquid crystal panel 325 are provided on the front surface of the intermediate member 32. In this way, the intermediate member 32 is positioned between the indication panel 31/the liquid crystal panel 325 and the circuit board 32. Furthermore, the intermediate member 32 is formed with three second through holes 320 through which positioning members 21 (which will be described later) pass. The shapes of the three holes will be described in detail later. In addition, the number of holes may be larger or smaller than three without departing the scope of the present embodiment.

The circuit board 33 includes a plate-like base 330, a first stepping motor 331 for rotating the pointer 3111, a second stepping motor (not illustrated) for rotating the pointer 3121, a third stepping motor (not illustrated) for rotating the pointer 3131, a first light emitting element 332a (an example of a first light source), second light emitting elements 332b (an example of a second light source), a third light emitting element 332c (an example of a third light source), a fourth light emitting element 332d (an example of a fourth light source), and other light sources (not illustrated). The first stepping motor 331, the second stepping motor, the third stepping motor, the first light emitting element 332a, the second light emitting elements 332b, the third light emitting element 332c, the fourth light emitting element 332d, and other light sources (not illustrated) are mounted on the front surface or the rear surface of the base 330. In addition, the base 330 is formed with three third through holes 330 through which the positioning members 21 (which will be described later) pass. The shapes of the three holes will be described in detail later. In addition, the number of holes may be larger or smaller than three without departing the scope of the present embodiment.

Furthermore, the circuit board 33 further includes other electronic parts and the like (not illustrated) mounted on the base 330, wherein these electronic parts configure a control circuit for controlling the driving of the constituent elements such as the stepping motor 331.

The control circuit receives various control signals from an exterior. In response to the received control signals, the control circuit operates the first stepping motor 331, the second stepping motor, the third stepping motor and the like. Furthermore, in response to the control signals received from the exterior, the control circuit allows the first light emitting element 332a, the second light emitting elements 332b, the third light emitting element 332c, the fourth light emitting element 332d, other light sources and the like to emit light at a proper timing.

The first stepping motor 331 has a rotary shaft 3110 that is mounted on the rear surface of the base 330, and extends to the front surface side of the base 330 with passing through the through hole formed in the base 330. The rotary shaft 3110 is provided with the pointer 3111. The control circuit operates the stepping motor 331 based on a control signal that is received from the exterior and corresponds to a vehicle speed. In this way, the stepping motor 331 rotates the rotary shaft 3110 at an angle (a rotational angle) corresponding to the vehicle speed, thereby rotating the pointer 3111 by the rotational angle.

The second stepping motor has a rotary shaft 3120 that is mounted on the rear surface of the base 330, and extends to the front surface side of the base 330 with passing through the through hole formed in the base 330. The rotary shaft 3120 is provided with the pointer 3121. The control circuit operates the second stepping motor based on a control signal that is received from the exterior and corresponds to the RPM of an engine. In this way, the second stepping motor rotates the rotary shaft 3120 at an angle (a rotational angle) corresponding to the RPM of an engine, thereby rotating the pointer 3121 by the rotational angle.

The third stepping motor has a rotary shaft 3130 that is mounted on the rear surface of the base 330, and extends to the front surface side of the base 330 with passing through the through hole formed in the base 330. The rotary shaft 3130 is provided with the pointer 3131. The control circuit operates the third stepping motor based on a control signal that is received from the exterior and corresponds to the amount of remaining fuel. In this way, the third stepping motor rotates the rotary shaft 3130 at an angle (a rotational angle) corresponding to the amount of remaining fuel, thereby rotating the pointer 3131 by the rotational angle.

The first light emitting element 332a is mounted on the front surface of the base 330, and is provided outward (at an outer edge side of a speed indication part (an example of a first indication part) which will be described later) 311 more than a first reflection part 321, which will be described later, about the rotary shaft 3110 when the vehicle meter 1 is viewed from the front side. The first light emitting element 332a is a side-view light source that emits light in a direction (a direction approximately perpendicular to a front and rear direction) toward the rotary shaft 3110 from the outer edge of the speed indication part 311, and for example, is a side-view LED (Light Emitting Diode). The first light emitting element 332a is mainly used for illuminating the speed indication part 311 which will be described later.

The second light emitting element 332b is mounted on the front surface of the base 330, and is provided inward (at the side of the rotary shaft 3110) more than the first reflection part 321 when the vehicle meter 1 is viewed from the front side. The second light emitting element 332b is a top-view light source that emits light toward (toward the front side) an alert indication part (an example of a second indication part) 314, which will be described later, and for example, is a top-view LED. The second light emitting element 332b is provided in a plural number (may be one), wherein each second light emitting element 332b is used for illuminating each element 314a of the alert indication part 314 which will be described later.

The third light emitting element 332c is mounted on the front surface of the base 330, and is provided at a position opposite of the first light emitting element 332a and provided outward (at a side of the liquid crystal panel 325 which will be described later, that is, a lower side) more than a third reflection part 323, which will be described later, about the rotary shaft 3110 when the vehicle meter 1 is viewed from the front side. The third light emitting element 332c is a side-view light source that emits light in a direction toward the rotary shaft 3110 from the position of the opposite side, and for example, is a side-view LED. The first light emitting element 332a is mainly used for illuminating the liquid crystal panel 325 which will be described later.

The fourth light emitting element 332d is mounted on the front surface of the base 330 and at a position in the vicinity of the rotary shaft 3110. The fourth light emitting element 332d is a top-view light source that emits light toward the front side and for example, is a top-view LED. The fourth light emitting element 332d is used for illuminating the pointer 3111. Here, the pointer 3111 is provided with a light guide part (not illustrated), wherein the light guide part receives the light emitted from the fourth light emitting element 332d, so that light is emitted through the whole or a part of the pointer 3111. In this way, the pointer 3111, through which the light is emitted, points the speed indication part 311 illuminated by the first light emitting element 332a, so that it is possible for a user to recognize a traveling speed even in a dark place.

Furthermore, a plurality of other light sources are properly mounted on the front surface of the base 330, and are used for illuminating an RPM indication part 312 and a fuel indication part 313 which will be described later.

The indication panel 31 has, as indication parts of vehicle information, the speed indication part 311 serving as an index part for indicating a vehicle speed, the RPM indication part 312 serving as an index part for indicating the RPM of an engine, the fuel indication part 313 serving as an index part for indicating the amount of remaining fuel, the alert indication part 314 serving as an index part for indicating predetermined alert, and the like. The indication panel 31 is provided with a plate-like member made of synthetic resin and having a predetermined shape, and a decorative layer formed on the front surface and/or the rear surface of the plate-like member through coating, printing and the like. By the decorative layer, the indication parts are expressed. In addition, in the present embodiment, since the indication parts are expressed by cut-out characters (or cutout pictures) and the like, they allow light to pass therethrough. In addition, in another example, the decorative layer may be formed such that surrounding areas of the indication parts allow light to pass therethrough and the indication parts block the light. Even in any case, as will be described later, each of the speed indication part 311, the RPM indication part 312, the fuel indication part 313, the alert indication part 314 and the like, which are the indication parts, is illuminated by light from the first light emitting element 332a, the second light emitting element 332b, and other light sources, so that it is possible for a user to view each indication part by whether each indication part is lightened or the surrounding thereof is lightened, even in a dark place. Furthermore, the indication panel 31 is formed with three first through holes 310 through which the positioning members 21 (which will be described later) pass. The shapes of the three holes will be described in detail later. In addition, the number of holes may be larger or smaller than three without departing the scope of the present embodiment.

The speed indication part 311 is configured by a plurality of scales 311a and a plurality of numeral values 311b. The pointer 3111 rotated by the first stepping motor 331 at a rotational angle corresponding to a traveling speed points the scale 311a or between the scales 311a (that is, points the speed indication part 311), so that it is possible for a user viewing this to understand a traveling speed of a vehicle based on the scales 311a and the numeral values 311b. The scales 311a and the numeral values 311b are disposed in an approximately arc shape to surround a part of the periphery of the rotary shaft 3110. That is, the speed indication part 311 is formed in an approximately arc shape to surround a part of the periphery of the rotary shaft 3110. In addition, in the present embodiment, the speed indication part 311 is formed in an approximately semi-arc shape as an example of the approximately arc shape. However, in another example of the approximately arc shape, for example, the speed indication part 311 may be formed in an approximately quarter arc shape. Furthermore, since it is sufficient if the speed indication part 311 is pointed by the pointer 3111 and has a shape capable of indicating a speed, the shape is not limited to the approximately arc shape. For example, other shapes may be employed if they surround a part of the periphery of the rotary shaft 3110. Furthermore, since it is sufficient if the speed indication part 311 is an index part and the like pointed by the pointer 3111 to allow a user to understand a speed, the speed indication part 311 may be configured by other components other than the plurality of scales 311a and the plurality of numeral values 311b.

The alert indication part 314 is disposed near around the rotary shaft 3110. The alert indication part 314 includes a plurality of symbol marks (an example of elements 314a of the alert indication part 314) for indicating an alert such as a seat belt wearing sign, a sign indicating that the battery level is low, a sign indicating that the amount of gasoline and the like is small, or a sign indicating that a door is not shut properly. In addition, the number of elements 314a may be one.

The RPM indication part 312 is configured by a plurality of scales 312a and a plurality of numeral values 312b. The pointer 3121 rotated by the second stepping motor at a rotational angle corresponding to the RPM of an engine points the scale 312a or between the scales 312a (that is, points the RPM indication part 312), so that it is possible for a user viewing this to understand the RPM of an engine based on the scales 312a and the numeral values 312b, for example. In addition, in the present embodiment, the RPM indication part 312 is formed in an approximately arc shape. However, since it is sufficient if the RPM indication part 312 is pointed by the pointer 3121 and has a shape capable of indicating the RPM, the shape is not limited to the approximately arc shape. For example, other shapes may be employed if they surround a part of the periphery of the rotary shaft 3120. Furthermore, since it is sufficient if the RPM indication part 312 is an index part and the like pointed by the pointer 3121 to allow a user to understand the RPM of an engine, the RPM indication part 312 may be configured by other components other than the plurality of scales 312a and the plurality of numeral values 312b.

Figure 2:
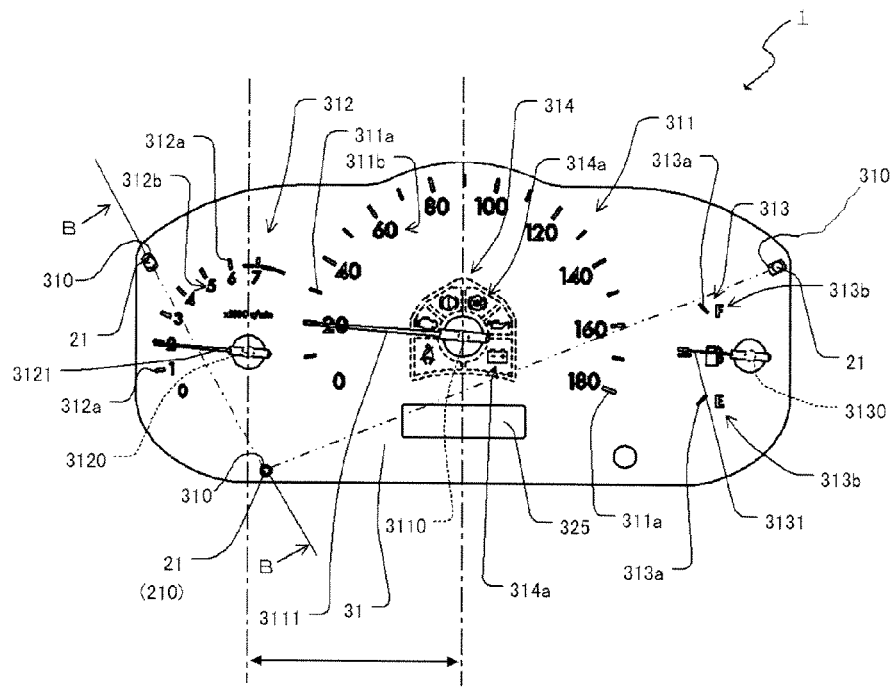
FIG. 2 is a plan view when a meter body of the vehicle meter of FIG. 1 is viewed from a front side.

The fuel indication part 313 is configured by a plurality of scales 313a and a plurality of characters 313b. The pointer 3131 rotated by the third stepping motor at a rotational angle corresponding to the amount of remaining fuel points the scale 313a or between the scales 313a (that is, points the fuel indication part 313), so that it is possible for a user viewing this to understand the amount of remaining fuel based on the scales 313a and the characters 313b. In addition, the characters 313b is configured by characters necessary for understanding the amount of remaining fuel, such as F (Full) and E (Empty) as illustrated in FIG. 2. In addition, in the present embodiment, the fuel indication part 313 is formed in an approximately arc shape. However, since it is sufficient if the fuel indication part 313 is pointed by the pointer 3131 and has a shape capable of indicating the amount of remaining fuel, the shape is not limited to the approximately arc shape. For example, other shapes may be employed if they surround a part of the periphery of the rotary shaft 3130. Furthermore, since it is sufficient if the fuel indication part 313 is an index part and the like pointed by the pointer 3131 to allow a user to understand the amount of remaining fuel, the fuel indication part 313 may be configured by other components other than the plurality of scales 313a and the plurality of characters 313b.

The intermediate member 32 is provided with the first reflection part 321, a second reflection part 322, a third reflection part 323, and a fourth reflection part 324. The intermediate member 32, for example, is configured in a shape, which will be described below, using hard synthetic resin and the like. Each of the first reflection part 321, the second reflection part 322, the third reflection part 323, and the fourth reflection part 324, for example, includes a mirror-finished surface of the intermediate member. Here, although the intermediate member 32 is formed as a single member, this is not a limitation, and may include a plurality of members.

Figure 5:
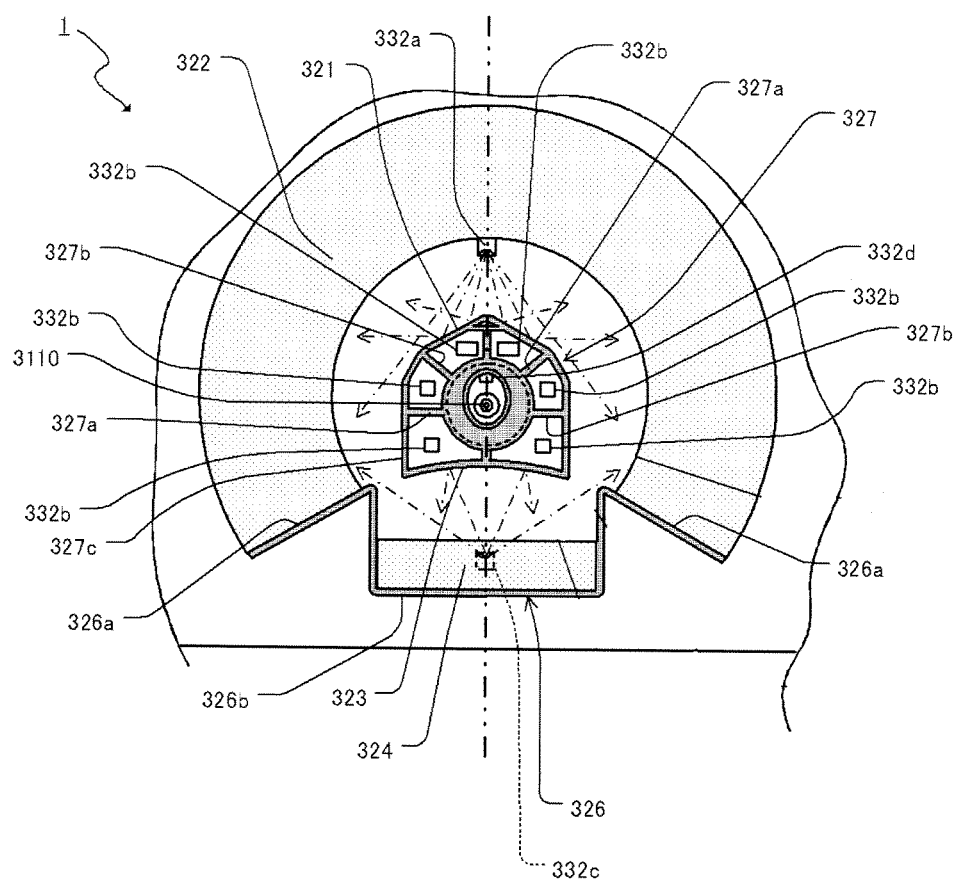
FIG. 5 is a schematic expanded plan view of the speedometer and the like of the meter body of FIG. 1, except for an indication panel and pointers.

The intermediate member 32 is provided with an enclosure body 327 having a shape rising from the base 330 and surrounding the rotary shaft 3110, wherein the enclosure body 327 has an approximately pentagonal section in shape and includes the first reflection part 321 and the third reflection part 323. The enclosure body 327 is provided with inner walls 327a that partition inner spaces 327b, in addition to a tubular outer peripheral wall 327c. The inner spaces 327b are provided in a plural number such that the rear surface sides of the element 314a form the inner spaces 327b by the inner walls 327a in correspondence with the element 314a of the alert indication part 314. Furthermore, on the circuit board 33, the second light emitting elements 332b are mounted in the inner spaces 327b, respectively. In this way, if the second light emitting elements 332b emit light, since the elements 314a of the alert indication part 314, which correspond to the inner spaces 327b including the second light emitting elements 332b, are directly illuminated, the elements 314a of the alert indication part 314 are brightly lightened. In addition, since the light does not reach other elements by the inner walls 327a, it is possible to lighten only a desired element. Furthermore, the intermediate member 32 is provided with a wall-like body 326 having a plate-like shape rising from the base 330 and corresponding to both ends of the speed indication part 311 and the lower side of the outer edge of the liquid crystal panel 325 which will be described later as shown in FIG. 5. Of the wall-like body 326, a part (a first part 326a) corresponding to both ends of the speed indication part 311 is formed in an approximately chevron shape so as to be connected to both ends of the second reflection part 322 when the vehicle meter 1 is viewed from the front side. Of the wall-like body 326, a part (a second part 326b) corresponding to the lower side of the outer edge of the liquid crystal panel 325 is formed in an approximately U shape when the vehicle meter 1 is viewed from the front side. The second part 326b of the wall-like body 326 and the fourth reflection part 324 are connected to each other.

Figure 3:
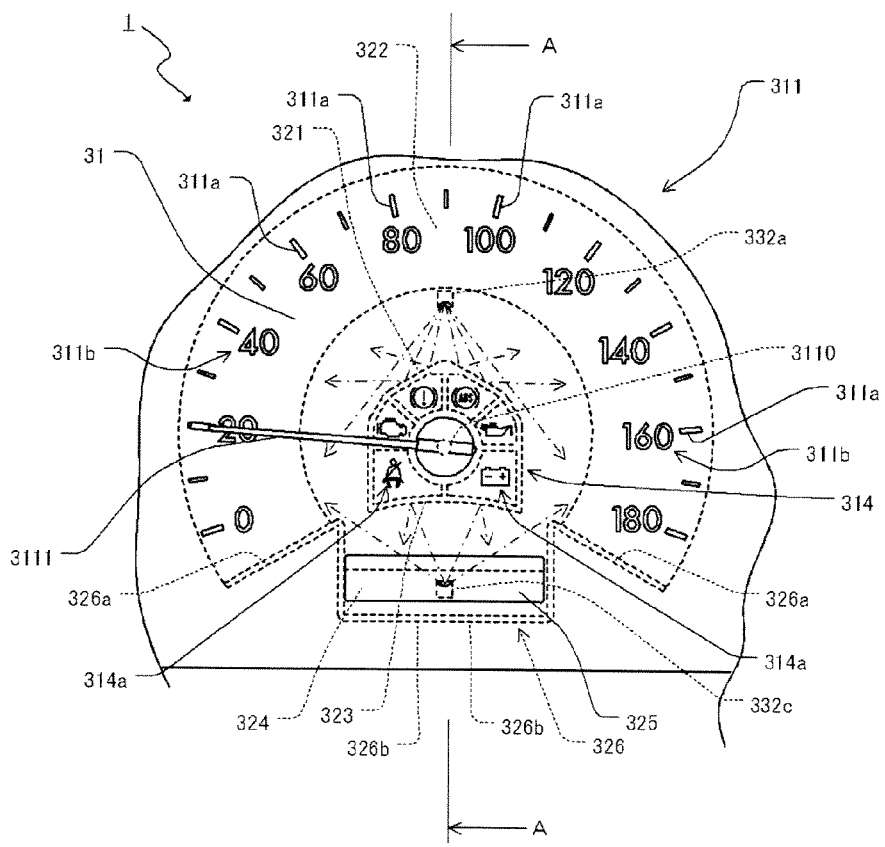
FIG. 3 is an expanded plan view of a speedometer and the like of the meter body of FIG. 1.
Figure 4:
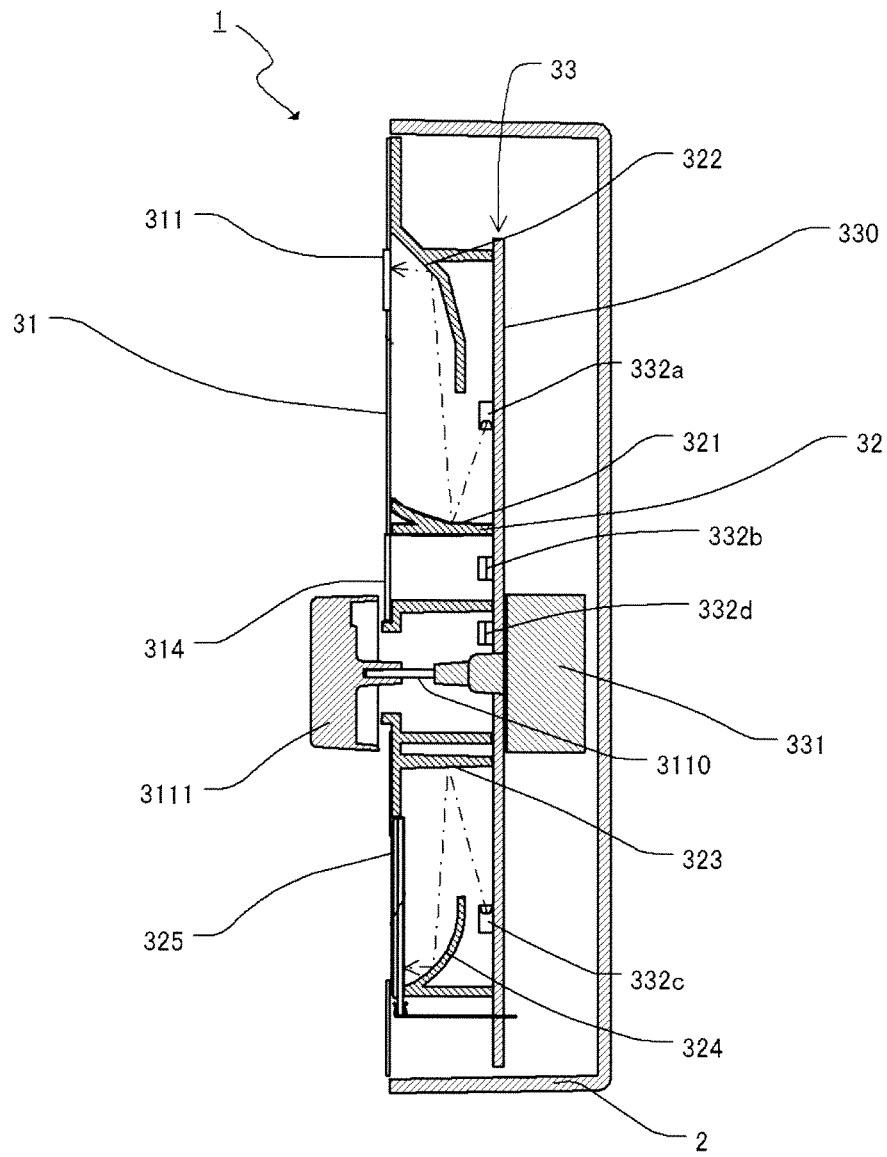
FIG. 4 is a schematic cross-sectional view taken along line A-A of FIG. 3.

The first reflection part 321 is a part of the side of the first light emitting element 332a, and includes a part of the outer peripheral wall 327c of the enclosure body 327, which approximately faces the third reflection part 323. A reflection surface of the first reflection part 321 is configured by a part (a surface facing the second reflection part 322) of an outer peripheral surface of the enclosure body 327. In this way, the first reflection part 321 is provided to surround a part (in addition, in a modification, may be the whole) of the periphery of the rotary shaft 3110. The first reflection part 321 reflects light emitted from the first light emitting element 332a toward an outer edge direction of the speed indication part 311 (that is, toward the second reflection part 322 which will be described later) when the vehicle meter 1 is viewed from the front side (refer to dotted line arrows of FIG. 3 to FIG. 5). In addition, the dotted line arrows of FIG. 3 to FIG. 5 represent main optical paths.

The third reflection part 323 is a part of the side of the third light emitting element 332c, and constitutes a lower part (a part of the side of the liquid crystal panel 325) of the outer peripheral wall 327c of the enclosure body 327. A reflection surface of the third reflection part 323 is configured by a surface (a surface of the side of the liquid crystal panel 325) of a lower side of the outer peripheral surface of the enclosure body 327. The third reflection part 321 reflects light emitted from the third light emitting element 332c toward an outer edge direction of the vehicle meter 1 (that is, toward the side of the liquid crystal panel 325) when the vehicle meter 1 is viewed from the front side (refer to the dotted line arrows of FIG. 3 to FIG. 5).

The second reflection part 322 is formed corresponding to the speed indication part 311. Specifically, the second reflection part 322, for example, is formed at a rear surface side of the speed indication part 311 according to the shape of the speed indication part 311. Furthermore, the second reflection part 322 approximately faces the first reflection part 321. In this way, the second reflection part 322 is provided to surround a part (in addition, in a modification, may be the whole) of the periphery of the rotary shaft 3110. Furthermore, a reflection surface of the second reflection part 322 is directed to the front side, and has a slope with respect to a direction perpendicular to the front and rear direction. The second reflection part 322 reflects light having reached the second reflection part 322 toward the speed indication part 311. The speed indication part 311 is illuminated by the light reflected by the second reflection part 322 (refer to the dotted line arrows of FIG. 3 to FIG. 5).

The fourth reflection part 324 is formed corresponding to the liquid crystal panel 325 which will be described later. Specifically, the fourth reflection part 324, for example, is formed at a rear surface side of the liquid crystal panel 325 according to the shape of the liquid crystal panel 325. Furthermore, the fourth reflection part 324 approximately faces the third reflection part 323. Furthermore, a reflection surface of the fourth reflection part 324 is directed to the front side, and has a slope with respect to a direction perpendicular to the front and rear direction. The fourth reflection part 324 reflects light having reached the fourth reflection part 324 toward the liquid crystal panel 325. The liquid crystal panel 325 is illuminated by the light reflected by the fourth reflection part 324 (refer to the dotted line arrows of FIG. 3 to FIG. 5).

The liquid crystal panel 325 is disposed at a position opposite to (below) the speed indication part 311 with respect to the rotary shaft 3110. Furthermore, the liquid crystal panel 325 is electrically connected to the circuit board 33. The control circuit of the circuit board 33 drives the liquid crystal panel 325 based on the control signal received from the exterior, and allows predetermined information such as a traveling distance to be displayed on the liquid crystal panel 325. Furthermore, the liquid crystal panel 325 is illuminated from the rear side by the light reflected by the fourth reflection part 324, and allows light emission, thereby displaying the predetermined information.

Furthermore, the meter body 3 (particularly, the intermediate member 32) is configured such that a first approximately closed space corresponding to the speed indication part 311 and a second approximately closed space corresponding to the liquid crystal panel 325 are formed between the indication panel 31 and the circuit board 33. The intermediate member 32 is for partitioning the first approximately closed space and the second approximately closed space. The first approximately closed space is a space generally surrounded by the indication panel 31, the circuit board 33, a part of the outer peripheral wall of the enclosure body 327 including the reflection surface of the first reflection part 321, the reflection surface of the second reflection part 322, and the first part 326a of the wall-like body 326. Meanwhile, the second approximately closed space is a space generally surrounded by the indication panel 31, the circuit board 33, the reflection surface of the third reflection part 323, and the second part 326b of the wall-like body 326. The meter body 3 (the intermediate member 32) is configured to form each approximately closed space described above (refer to FIG. 4), and is configured such that the first approximately closed space communicates with the second approximately closed space, and a gap, through which a part of light emitted by the first light emitting element 332a or the third light emitting element 332c passes, is formed (refer to FIG. 5). That is, the intermediate member 32 is for partitioning the gap. Specifically, when the vehicle meter 1 is viewed from the front side, lower corners (lower apexes of an approximately pentagonal shape) of the enclosure body 327 having an approximately pentagonal shape are separated from bonding portions between the first part 326a and the second part 326b, so that the gap is formed. Therefore, the first approximately closed space and the second approximately closed space are not closed spaces, but approximately closed spaces.

In accordance with the vehicle meter 1 according to the present embodiment, the first reflection part 321 and the second reflection part 322 reflect the light emitted from the first light emitting element 332a, so that the uniformity of illumination to the speed indication part 311 is excellent. Specifically, firstly, the first reflection part 321 reflects the light emitted from the first light emitting element 332a toward the outer edge direction of the speed indication part 311, and then the second reflection part 322 reflects the light reflected by the first reflection part 321 toward the speed indication part 311. In this way, it is possible to increase a ratio of light, which is reflected twice or more by the first reflection part 321 and the second reflection part 322, with respect to light having reached the speed indication part 311 from the first light emitting element 332a, thereby improving light diffusion efficiency. With such a structure, in the vehicle meter 1 according to the present embodiment, even when the number of light sources is small, the uniformity of illumination to the speed indication part 311 is excellent. In addition, in the present embodiment, only one first light emitting element 332a is provided. However, it is possible to provide a plurality of first light emitting elements 332a to face the enclosure body 327 (the reflection surface of the first reflection part 321) according to necessity. In this case, the plurality of first reflection parts 321 may be provided corresponding to the plurality of first light emitting elements 332a.

Furthermore, the vehicle meter 1 is configured such that at least a part of light, other than the light reflected by the first reflection part 321 among the light emitted from the first light emitting element 332a, directly reaches the second reflection part 322 (particularly, both end portions of the second reflection part 322), is reflected by the second reflection part 322, and illuminates the speed indication part 311 from the rear side. With such a configuration, both end portions of the speed indication part 311 (areas far away from the first light emitting element 332a) are illuminated by light reflected by the second reflection part 322 once. Such a configuration contributes to the uniformity of illumination to the speed indication part 311.

In the present embodiment, the shape and the horizontal length of the first reflection part 321 and a positional relation between the first light emitting element 332a and the first reflection part 321 are adjusted such that light, which is emitted from the first light emitting element 332a and travels an end among light radially spread when the vehicle meter 1 is viewed from the front side, travels an outer side, in the horizontal direction, than an end portion of the first reflection part 321, so that a part of the light emitted from the first light emitting element 332a directly reaches the second reflection part 322. Here, the horizontal direction is a direction perpendicular to a vertical direction.

Particularly, when the vehicle meter 1 is viewed from the front side, the first reflection part 321 projects toward the first light emitting element 332a such that an incident angle to the reflection surface of the first reflection part 321 of the light emitted from the first light emitting element 332a becomes large (refer to FIG. 3) as a distance between the reflection surface of the first reflection part 321 and the first light emitting element 332a is increased. The first reflection part 321 has such a shape, so that the light emitted from the first light emitting element 332a is reflected by the first reflection part 321 in correspondence with the speed indication part 311, and light not reflected by the first reflection part 321 directly reaches around both ends of the second reflection part 322 without being blocked by the first reflection part 321. Such a shape of the first reflection part 321 contributes to the uniformity of illumination to the speed indication part 311. Furthermore, a virtual line (refer to a double dot and dash line of FIG. 5), which connects a center position (a position of an apex of the enclosure body 327 having an approximately pentagonal shape when the indication panel 31 is viewed from the front side) of the first reflection part 321 having such a shape to the center of an optical axis of the first light emitting element 332a, is matched with a line that connects a center position (a position (a position corresponding to 90 not illustrated) of an intermediate scale of two scales 311a corresponding to "80" and "100" among the plurality of numerical values 311b in FIG. 3) of the speed indication part 311 (the second reflection part 322) to a position on an axial line of the rotary shaft 3110, so that it is possible to effectively illuminate the entire area of the speed indication part 311 using a necessary minimum number of first light emitting elements 332a (a single first light emitting element 332a in the present embodiment). In addition, in the present embodiment, since the enclosure body 327 includes the first reflection part 321, the upper shape of the first reflection part 321 is an approximately pentagon when the vehicle meter 1 is viewed from the front side. However, the present invention is not limited thereto. For example, the first reflection part 321 may have an approximately circular shape or an approximately polygonal shape if the same effect can be obtained. In addition, when the vehicle meter 1 is viewed from the front side, the first reflection part 321 and the first light emitting element 332a are disposed such that a center position (a center position in the horizontal direction) of the reflection surface of the first reflection part 321 faces the first light emitting elements 332a.

Furthermore, the second light emitting elements 332b emit light to illuminate the elements 314a of the alert indication part 314. Particularly, in the vehicle meter 1 according to the present embodiment, since the first light emitting element 332a is not provided in the vicinity of the rotary shaft 3110 and an upper surface of the enclosure body 327 having the first reflection part 321 and the rotary shaft 3110 are not adjacent to each other, it is possible to provide the second light emitting elements 332b closer to the side of the rotary shaft 3110 than the first reflection part 321. In this way, it is possible to provide the alert indication part 314 that is illuminated by the second light emitting elements 332b from the rear side. Thus, in the vehicle meter 1 according to the present embodiment, it is possible to increase the degree of design freedom of the indication panel. In addition, this point is caused by the fact that the first light emitting element 332a is positioned outside the enclosure body 327.

In accordance with the vehicle meter 1 according to the present embodiment, the third reflection part 323 and the fourth reflection part 324 reflect light emitted from the third light emitting element 332c, so that the uniformity of illumination to the liquid crystal panel 325 is excellent. Specifically, the vehicle meter 1 has a structure in which the third reflection part 323 reflects the light emitted from the third light emitting element 332c toward an opposite side of the rotary shaft 3110, and the fourth reflection part 324 reflects the light reflected by the third reflection part 323 toward the liquid crystal panel 325, and it is possible to increase a ratio of light reflected twice or more by the third reflection part 323 and the fourth reflection part 324, relative to the light having reached the rear surface of the liquid crystal panel 325 from the third light emitting element 332c, thereby improving light diffusion efficiency. With such a structure, in the vehicle meter 1 according to the present embodiment, even when the number of light sources is small, illumination to the liquid crystal panel 325 is excellent.

Furthermore, the vehicle meter 1 is configured such that the first approximately closed space corresponding to the speed indication part 311 and the second approximately closed space corresponding to the liquid crystal panel 325 are formed between the circuit board 33 and the indication panel 31, the first approximately closed space and the second approximately closed space communicate with each other, and the gap, through which a part of light emitted by the first light emitting element 332a or the third light emitting element 332c passes, is formed. Therefore, even when one of the first light emitting element 332a and the third light emitting element 332c suffers from non-lighting, light emitted from other light emitting elements illuminates, through the gap, the space that suffers from the non-lighting. With such a configuration, in the vehicle meter 1 according to the present embodiment, even when one of the first light emitting element 332a and the third light emitting element 332c suffers from the non-lighting, it is possible to perform a fail-safe function of allowing a user to view the speed indication part 311 and the liquid crystal panel 325.

In addition, since it is sufficient if the intermediate member 32 and the like are configured to have the functions as described above, it is possible to properly change the shapes and the like thereof. Furthermore, the speedometer has the configuration of each reflection part in the above description. However, additionally or alternatively, a tachometer, a fuel gauge and the like may have the configuration.

So far, the configuration of the meter body 3 has been mainly described. Hereinafter, the configurations of the rear case 2 and the front case 4 will be described.

The rear case 2 is made of hard synthetic resin and the like, and is provided with three positioning members 21. The meter body 3 is disposed (accommodated) at the front side of the rear case 2.

The front case 4 includes an attachment member 41 (a so-called face member) and a transmission member 42. The attachment member 41 is made of hard synthetic resin and the like. Meanwhile, the transmission member 42, for example, is made of full-face glass, which allows a visible ray to pass therethrough, or synthetic resin. The attachment member 41 and the transmission member 42 are fitted with each other by projections formed at one or both thereof, thereby constituting the front case 4. The front case 4 is disposed to cover the front side of the meter body 3 and is combined with the rear case 2, so that the meter body 3 is accommodated in the rear case 2 and the front case 4 and is protected from dust or collision. A user views movement of each pointer of the meter body 3 through the transmission member 42 of the front case 4, each indication part (particularly, a lightened part).

Figure 6:
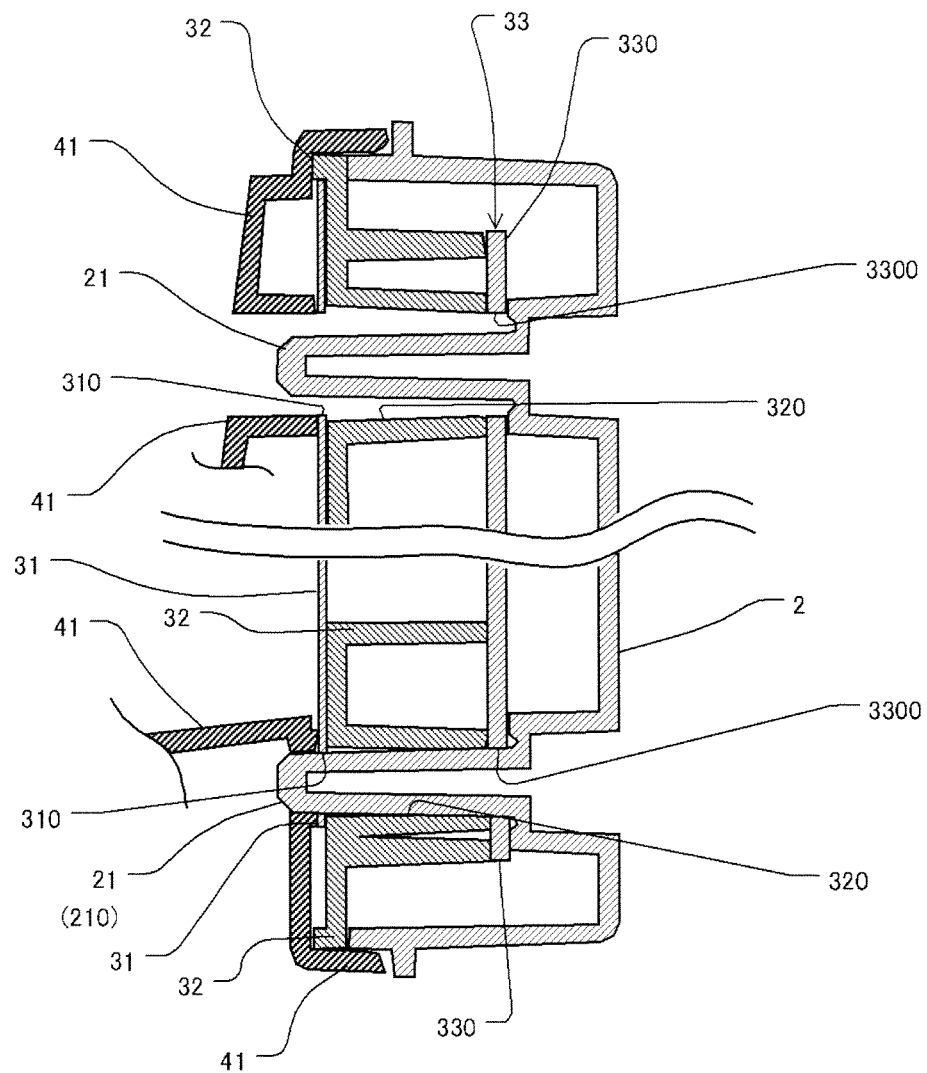
FIG. 6 is a schematic cross-sectional view taken along line B-B of FIG. 2.

The positioning members 21 are rod-like members and are formed in a round pin shape. As illustrated in FIG. 1, the positioning members 21 vertically extend from the bottom surface of the rear case 2 in the front direction, and reach the front case 4 with passing through the through holes (the first through hole 310, the second through hole 320, and the third through hole 3300) of the meter body 3, thereby positioning the meter body 3 and the front case 4 with respect to the rear case. Furthermore, as illustrated in FIG. 6, the indication panel 31, the intermediate member 32, and the circuit board 33, which constitute the meter body 3, are also passed through by the positioning members 21, and are positioned at a time. In this way, by the positioning members 21 provided to the rear case 2, main members constituting the vehicle meter 1 are positioned and fixed at a time. In addition, in the vehicle meter 1 according to the present embodiment, the rear case 2 has the positioning members 21. However, in a modification, instead that the rear case 2 does not have the positioning members 21, the front case 4 may have the positioning members. Furthermore, only a part of the positioning members 21 may be provided to the front case 4. Furthermore, each (in FIG. 2, one hole at the lower side (a hole corresponding to a reference positioning member 210 which will be described later)) of the first through holes 310, the second through holes 320, and the third through holes is a round hole having a size approximately coinciding with the positioning member 21 having a round pin shape. Moreover, some (in FIG. 2, holes formed at the upper right and left sides one by one) of the first through holes 310, the second through holes 320, and the third through holes are long holes wherein an inner diameter dimension of a hole extending toward the round hole is larger than that of the positioning member 21 by a predetermined dimension, and an inner diameter dimension of a hole perpendicular to the round hole coincides with that of the positioning member 21. Furthermore, longitudinal axes (refer to a double dot and dash line of FIG. 2) of the long holes intersect with each other at the center of the round hole. In this way, it is possible to prevent the deterioration of assembling efficiency due to a dimension error of parts while maintaining mutual positioning accuracy of the parts, and to simultaneously absorb position displacement of the parts due to a difference (a cold heat cycle) among thermal expansion coefficients between the parts. In addition, if the round hole is a hole fitted around the positioning member 21 without a play (no permission of the position displacement) or is a notch, the shape thereof is arbitrary, and for example, may be a square hole. Furthermore, if the long holes are holes wherein an inner diameter dimension of a hole permitting a gap with the positioning member 21 and extending toward the round hole is larger than that of the positioning member 21 by a predetermined dimension, and an inner diameter dimension of a hole perpendicular to the round hole corresponds to a size for suppressing the gap with the positioning member 21, the shapes thereof are arbitrary. In addition, similarly to each through hole of the meter body 3, the attachment member 41 constituting the front case 4 also has a round hole corresponding to the reference positioning member 210, and long holes corresponding to the other positioning members 21. Similarly to the round hole, the round hole formed in the attachment member 41 is a hole fitted around the positioning member 21 without a play (no permission of the position displacement) or is a notch, the shape thereof is arbitrary, and for example, may be a square hole. Furthermore, similarly to the long holes, if the long holes formed in the attachment member 41 are holes wherein an inner diameter dimension of a hole permitting a gap with the positioning member 21 and extending toward the round hole is larger than that of the positioning member 21 by a predetermined dimension, and an inner diameter dimension of a hole perpendicular to the round hole corresponds to a size for suppressing the gap with the positioning member 21, the shapes thereof are arbitrary.

Furthermore, when the vehicle meter 1 is viewed from the front side, it is desirable that the positioning member 21 corresponding to the round hole, which is one of the three positioning members 21, is disposed between rotary shafts of two pointers for pointing two indication parts (particularly, indication parts for which the accuracy of respectively pointing by the pointers is required). In the present embodiment, as illustrated in FIG. 2, between the rotary shaft 3110 of the speedometer and the rotary shaft 3120 of the tachometer (referring to FIG. 2, between broken lines passing through the rotary shafts), the reference positioning member 210 corresponding to the round hole is disposed (in FIG. 1 and FIG. 2, among the positioning members 21, a positioning member disposed as this is defined as the reference positioning member 210). The positioning members 21, other than the reference positioning member 210, are provided to restrict displacement in the rotational direction about the reference positioning member 210 with respect to the intermediate member 32 of the circuit board 33. By providing the positioning members 21 in this way, it is possible to restrict displacement in the rotational direction and displacement of a relative position of the intermediate member 32 and the circuit board 33, which may occur when the circuit board 33 is disposed on the intermediate member 32. Thus, in the vehicle meter 1, even when a plurality of members mainly constituting the vehicle meter 1 are positioned and fixed at a time, it is possible to prevent relative position displacement of the members. In this way, since it is also possible to prevent displacement of the indication panel 31 and the pointer 3111, the pointer 3121, and the pointer 3131 of the indication parts, even when they are positioned and fixed at a time, pointer indication standards in a manufacturing process strictly defined are satisfied, so that it is possible to improve a product yield. Furthermore, since the indication panel 32 has a plate-like member made of synthetic resin, a dimension thereof may be changed according to surrounding environments. In this regard, the reference positioning member 210 is disposed between the rotary shafts of the two pointers for respectively pointing the two indication parts. Thus, even when the dimension of the indication panel 32 has been changed, since the dimension of the indication panel 32 is changed about the reference positioning member 210, displacement of each of the two indication parts and the indication of the pointers is reduced. Consequently, the pointer indication standards in the manufacturing process are satisfied, so that it is possible to improve the product yield.

So far, in the embodiment, the pointer-type meter according to the present invention has been described using the vehicle meter 1. However, the present invention is not limited thereto. The vehicle meter 1 may be used in other pointer-type meters, for example, an aircraft meter, a ship meter, a watch and the like.

INDUSTRIAL APPLICABILITY

The present invention is available for a pointer-type meter.

REFERENCE SIGNS LIST

1 Vehicle Meter
2 Rear Case
21 Positioning Member
210 Reference Positioning Member
3 Meter Body
31 Indication Panel
310 First Through Hole
311 Speed Indication Part
311*a* Scale
311*b* Numerical Value
3110 Rotary shaft
3111 Pointer 312 RPM Indication Part
312a Scale
312b Numerical Value
3120 Rotary shaft
3121 Pointer
313 Fuel Indication Part
313a Scale
313b Character
3130 Rotary shaft
3131 Pointer
314 Alert Indication Part
314a Element
32 Intermediate Member
320 Second Through Hole
321 First Reflection Part
322 Second Reflection Part
323 Third Reflection Part
324 Fourth Reflection Part
325 Liquid crystal panel
326 Wall-like Body
326a First Part
326b Second Part
327 Enclosure Body
327a Inner Wall
327b Inner Space
327c Outer Peripheral Wall
33 Circuit Board
330 Base
3300 Third Through Hole
331 First Stepping Motor
332a First Light Emitting Element
332b Second Light Emitting Element
332c Third Light Emitting Element
332d Fourth Light Emitting Element
4 Front Case
41 Attachment Member
42 Transmission Member

The invention claimed is:

1. A pointer-type meter comprising:
a circuit board;
an indication panel that is disposed at a front side of the circuit board and includes a first indication part;
a pointer that points the first indication part; and
a rotary shaft that rotates the pointer, wherein
the circuit board includes a first light source that emits light toward the rotary shaft, and
the pointer-type meter further comprises:
  a first reflection part that is disposed between the circuit board and the indication panel, surrounds at least a part of a periphery of the rotary shaft, and reflects the light, which is emitted from the first light source, toward an outer edge of the indication part; and
  a second reflection part that is disposed between the circuit board and the indication panel, and reflects the light reflected by the first reflection part to illuminate the first indication part from a rear side, wherein:
at least a part of light, other than the light reflected by the first reflection part among the light emitted from the first light source, is configured to directly reach the second reflection part, be reflected by the second reflection part, and illuminate the first indication part from the rear side, and
the first reflection part projects toward the first light source when the pointer-type meter is viewed from the front side, and reflects a part of the light emitted from the first light source, and the second reflection part is disposed to surround the first reflection part when the pointer-type meter is viewed from the front side.

2. The pointer-type meter of claim 1, wherein
the indication panel comprises: a second indication part that is provided closer to a side of the rotary shaft than the first reflection part when the pointer-type meter is viewed from the front side, and
the circuit board comprises: a second light source that is provided closer to the side of the rotary shaft than the first reflection part when the pointer-type meter is viewed from the front side, and directly illuminates the second indication part.

3. The pointer-type meter of claim 1, wherein
the pointer-type meter further comprises a third indication part that is positioned at an opposite side of the first indication part about the rotary shaft when the pointer-type meter is viewed from the front side,
the circuit board comprises: a third light source that is positioned at an opposite side of the first light source about the rotary shaft when the pointer-type meter is viewed from the front side, and emits light toward the rotary shaft, and
the pointer-type meter further comprises: a third reflection part that reflects the light emitted from the third light source; and a fourth reflection part that reflects the light reflected by the third reflection part to illuminate the third indication part from the rear side.

4. The pointer-type meter of claim 1, wherein
the pointer-type meter is configured such that a first approximately closed space corresponding to the first indication part and a second approximately closed space corresponding to the third indication part are formed between the circuit board and the indication panel, the first approximately closed space and the second approximately closed space communicate with each other, and a gap, through which a part of the light emitted by the first light source or the third light source passes, is formed.

5. A pointer-type meter comprising:
a circuit board;
an indication panel that is disposed at a front side of the circuit board and includes a first indication part;
a pointer that points the first indication part; and
a rotary shaft that rotates the pointer, wherein
the circuit board includes a first light source that emits light toward the rotary shaft, and
the pointer-type meter further comprises:
  a first reflection part that is disposed between the circuit board and the indication panel, surrounds at least a part of a periphery of the rotary shaft, and reflects the light, which is emitted from the first light source, toward an outer edge of the indication part; and
  a second reflection part that is disposed between the circuit board and the indication panel, and reflects the light reflected by the first reflection part to illuminate the first indication part from a rear side, wherein:
the first light source is configured to emit light in a direction approximately parallel to a surface of the indication panel toward the first reflection part.

6. The pointer-type meter of claim 5, wherein:
the first reflection part projects toward the first light source when the pointer-type meter is viewed from the front side, and reflects a part of the light emitted from the first light source, and
the second reflection part is disposed to surround the first reflection part when the pointer-type meter is viewed from the front side.

7. The pointer-type meter of claim 5, wherein the indication panel comprises: a second indication part that is provided closer to a side of the rotary shaft than the first reflection part when the pointer-type meter is viewed from the front side, and the circuit board comprises: a second light source that is provided closer to the side of the rotary shaft than the first reflection part when the pointer-type meter is viewed from the front side, and directly illuminates the second indication part.

8. The pointer-type meter of claim 5, wherein the pointer-type meter further comprises a third indication part that is positioned at an opposite side of the first indication part about the rotary shaft when the pointer-type meter is viewed from the front side, the circuit board comprises: a third light source that is positioned at an opposite side of the first light source about the rotary shaft when the pointer-type meter is viewed from the front side, and emits light toward the rotary shaft, and the pointer-type meter further comprises: a third reflection part that reflects the light emitted from the third light source; and a fourth reflection part that reflects the light reflected by the third reflection part to illuminate the third indication part from the rear side.

9. The pointer-type meter of claim 5, wherein the pointer-type meter is configured such that a first approximately closed space corresponding to the first indication part and a second approximately closed space corresponding to the third indication part are formed between the circuit board and the indication panel, the first approximately closed space and the second approximately closed space communicate with each other, and a gap, through which a part of the light emitted by the first light source or the third light source passes, is formed.

* * * * *